United States Patent
Uzkan et al.

(10) Patent No.: US 7,040,303 B2
(45) Date of Patent: May 9, 2006

(54) COMBINED AFTERCOOLER SYSTEM WITH SHARED FANS

(75) Inventors: Teoman Uzkan, Indian Head Park, IL (US); Edward J. Cryer, III, Homer Glen, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 10/922,766

(22) Filed: Aug. 20, 2004

(65) Prior Publication Data
US 2006/0037590 A1    Feb. 23, 2006

(51) Int. Cl.
*F02B 29/04*    (2006.01)

(52) U.S. Cl. .......................... 123/563; 60/599
(58) Field of Classification Search .............. 60/599; 123/563; F02B 29/04
See application file for complete search history.

(56) References Cited

U.S. PATENT DOCUMENTS

| | | | | |
|---|---|---|---|---|
| 4,236,492 A | * | 12/1980 | Tholen | 123/563 |
| 4,317,439 A | * | 3/1982 | Emmerling | 123/563 |
| 5,809,981 A | * | 9/1998 | Berg-Sonne | 123/563 |
| 6,510,690 B1 | * | 1/2003 | Furukawa et al. | 123/563 |
| 6,604,515 B1 | * | 8/2003 | Marsh et al. | 123/563 |
| 6,883,314 B1 | * | 4/2005 | Callas et al. | 60/599 |

* cited by examiner

Primary Examiner—Sheldon J Richter
(74) Attorney, Agent, or Firm—Cook, Alex, McFarron, Manzo, Cummings & Mehler, Ltd.

(57) ABSTRACT

A cooling system including an intake air cooling subsystem and a liquid cooling subsystem for controlling intake air temperatures in a supercharged internal combustion diesel locomotive engine. The intake air cooling subsystem includes an air-to-water aftercooler and an air-to-air aftercooler having intake air sides connected to receive intake air flow in series between a supercharger and an engine. The liquid cooling subsystem includes at least one liquid cooling loop having a pump, a radiator and a water coolant side of the air-to-water aftercooler. At least one shared fan circulates air flow to the cooling air sides of the air-to-air aftercooler and the radiator. An optional air distribution control selectively directs circulated air flow between the air-to-air aftercooler, the radiator and other optional components of the cooling system.

15 Claims, 8 Drawing Sheets

COMBINED AFTERCOOLER SYSTEM WITH SHARED FANS

TECHNICAL FIELD

This invention relates to diesel electric locomotives and, more particularly, to cooling systems for cooling engine coolant and intake air in supercharged diesel engines.

BACKGROUND OF THE INVENTION

Diesel locomotive engines may utilize one or more superchargers to increase engine power by compressing ambient air to reduce its volume and increase its density. As the intake air is compressed by the supercharger, the air is heated to high temperatures. In order to reduce the temperature of the intake air and increase its density, an aftercooler is positioned downstream from the supercharger.

Tier 2 emission guidelines promulgated by the Environmental Protection Agency (EPA) set forth stringent emission standards for diesel locomotive engines. A preferred method of complying with the Tier 2 emission guidelines is to reduce intake air temperatures and thereby reduce the formation of NOx and other emissions during combustion.

Conventional locomotive cooling systems commonly use air-to-water aftercoolers, which reduce intake air temperatures only to around 180° Fahrenheit. In order to further reduce intake air temperatures, additional fans and substantially larger heat exchangers (aftercoolers and radiators) could be utilized. However, due to cost and space limitations, on locomotives, additional fans and larger heat exchangers are undesirable.

Accordingly, smaller and more efficient cooling systems capable of reducing intake air temperatures to meet EPA emission control requirements are desired.

SUMMARY OF THE INVENTION

The present invention provides simplified efficient locomotive cooling systems for significantly reducing supercharged diesel engine intake air temperatures.

In an exemplary embodiment, an air-to-water aftercooler and an air-to-air aftercooler are connected to receive intake air in series between a supercharger and an engine air box or an air intake manifold.

The air-to-water aftercooler is normally cooled by liquid engine coolant passed through a radiator for cooling. At least one shared fan circulates air flow through the air-to-air aftercooler and the radiator to transfer heat from the liquid coolant within the radiator and the intake air within the air-to-air aftercooler to the surrounding atmosphere.

If desired, a dynamic brake grid may be positioned in parallel or in series with the radiator and the air-to-air aftercooler to receive air flow from the shared fan. An optional air distribution control may be used to selectively alter circulated air flow between the air-to-air aftercooler, the radiator and the dynamic brake grid.

As the air-to-water aftercooler receives pressurized high temperature intake air from the supercharger, heat is transferred from the intake air to the liquid coolant flowing through the air-to-water aftercooler. The liquid coolant is then cooled by the radiator, which transfers heat from the liquid coolant to the surrounding atmosphere.

The intake air cooled by the air-to-water aftercooler is then directed to the air-to-air aftercooler where heat from the intake air is transferred to air circulated through the air-to-air aftercooler by the shared fan. The intake air cooled by the air-to-air aftercooler is then directed to an air box or an intake manifold of the engine.

The temperature of the liquid coolant and the heat discharged to the air-to-air aftercooler may be controlled by the shared fan which directs air flow through the air-to-air aftercooler and the radiator. Preferably, the air-to-air aftercooler and the radiator are positioned in series so that air is directed from the shared fan through the air-to-air aftercooler and then through the radiator. Alternatively, the air-to-air aftercooler and the radiator may be arranged in parallel so that air flow directed from the shared fan is split between the air-to-air aftercooler and the radiator by an air distribution control.

These and other features and advantages of the invention will be more fully understood from the following description of certain specific embodiments of the invention taken together with the accompanying drawings.

DESCRIPTION OF THE PREFERRED EMBODIMENT

In the following description, like numerals indicate like parts or features throughout the various figures of the drawings.

Figure 1:
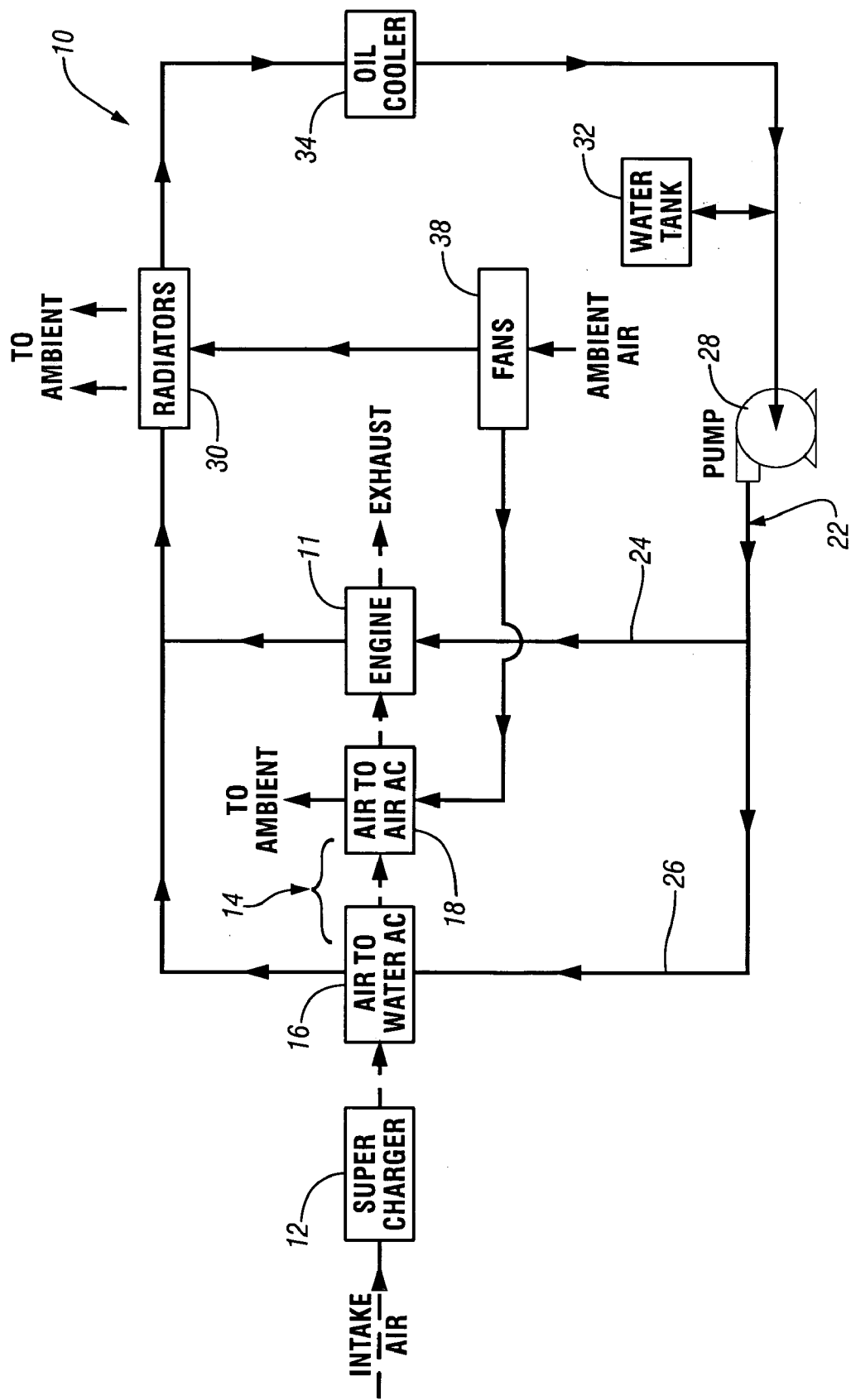
FIG. 1 is a schematic view of a cooling system for a supercharged diesel locomotive engine having parallel engine and aftercooler heat exchangers cooled by shared fans according the present invention.

Referring first to FIG. 1 of the drawings in detail, numeral 10 generally indicates an engine cooling system for a supercharged internal combustion diesel locomotive engine 11. The engine 11 receives compressed intake air from a supercharger 12 through an intake air cooling subsystem 14 including intake air sides of an air-to-water aftercooler 16 and an air-to-air aftercooler 18. The aftercoolers 16, 18 are positioned with their intake air sides in series in the air stream from the supercharger 12 to the engine 11.

The cooling system 10 also includes a liquid cooling subsystem 22 having first and second overlapping liquid cooling loops 24, 26. The first liquid cooling loop 24 includes a coolant pump 28, the diesel engine 11, the water sides of one or more water radiators 30, a water (coolant) tank 32 and an optional oil cooler 34. The second liquid cooling loop 26 includes the water side of the air-to-water aftercooler 16 as well as the coolant pump 28, the radiator 30, the water tank 32, and the optional oil cooler 34 of the first cooling loop 24. Thus, the engine 11 and the air-to-water aftercooler 16 are connected in parallel in the liquid cooling subsystem 22.

Cooling system 10 further includes one or more shared fans 38 having an ambient air intake and parallel cooling air discharge connections to cooling air sides of the air-to-air aftercooler 18 and the radiators 30.

In operation, the supercharger, driven mechanically and/or by engine exhaust gases, provides compressed intake air to the engine for burning in the cylinders, not shown. Compression of the air increases its temperature in excess of 300° F., which is subsequently reduced by passing through the aftercoolers 16, 18. Preferably, the air-to-water aftercooler reduces the temperature of the intake air to between 200° F. and 220° F. and the air-to-air aftercooler further reduces the temperature of the intake air to between 100° F. and 130° F. This increases the charge density before the intake air enters the engine cylinders. The reduced charge temperature significantly reduces the nitrogen oxides (NOx) and particulate emissions formed during combustion while at the same time improving engine efficiency and durability. To this end the cooling system 10 operates to provide the desired cooling of the intake air as well as to maintain necessary cooling of the cylinders and other components of the engine.

In the liquid cooling subsystem 22, the water tank 32 provides storage for excess coolant and a pressure head on the inlet of the coolant pump 28. The pump discharges coolant to both cooling loops 24, 26.

In the first loop 24, coolant from the pump first passes through the engine 11 where excess heat is transferred to the coolant.

In the parallel second loop 26, coolant passes through the water side of the air-to-water aftercooler 16 where excess heat from the intake air is transferred to the coolant. Thereafter, the loops 24, 26 are joined so that the coolant passes through the radiators 30 where the coolant is cooled by cooling air flow. The coolant then flows through the oil cooler 34, for cooling the engine oil, and returns to the pump inlet.

The shared fans 38 circulate ambient air in parallel through cooling air discharge connections to cooling air sides of the air-to-air aftercooler 18 and the radiators 30 to transfer excess heat from the intake air and the liquid coolant to the circulated air. Sharing the fans 38 reduces the amount of space required for the engine cooling system 10 and also reduce the manufacturing costs of the cooling system.

Figure 2:
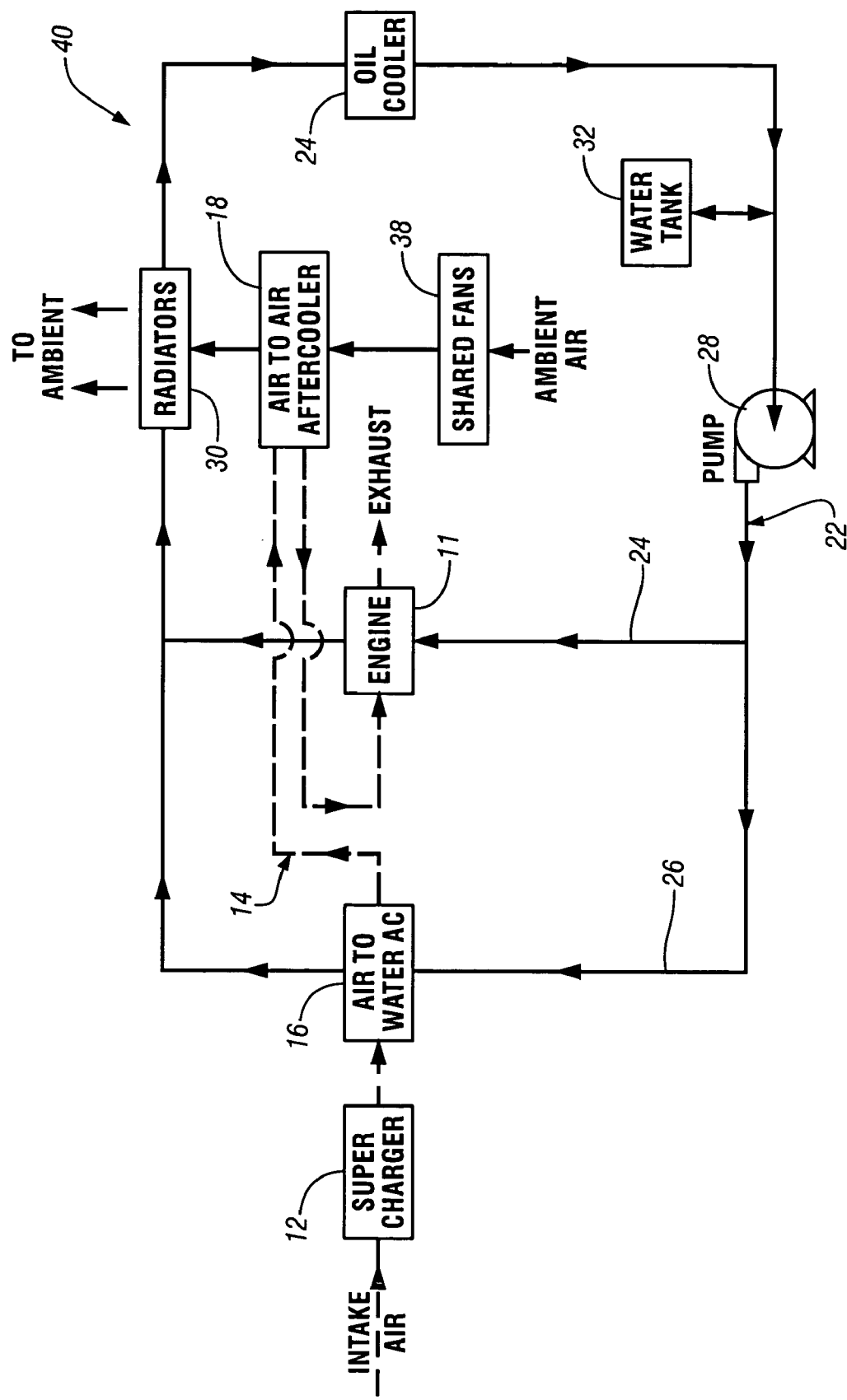
FIG. 2 is a similar view of an alternative embodiment featuring series heat exchangers cooled by shared fans.

FIG. 2 illustrates an alternative embodiment of cooling system 40 similar to system 10. In this embodiment, the cooling air sides of the air-to-air aftercooler 18 and the radiator 30 are positioned to receive circulated air flow from the shared fans 38 in series. Preferably, the cooling air passes to the air-to-air aftercooler 18 first and to the radiator 30 second to provide the coolest air to the aftercooler and obtain the lowest possible intake air temperature.

In operation, cooling system 40 is similar to cooling system 10 in that system 40 maintains the operating temperature of the engine 11 and reduces the intake air temperatures to improve fuel economy and reduce NOx and particulate emissions. The shared fan 38 circulates air to the cooling air side of the air-to-air aftercooler 18 to draw heat from the intake air to the circulated air. The circulated air is then passed through the cooling air side of the radiator 30 to draw heat from the liquid coolant to the circulated air.

Figure 3:
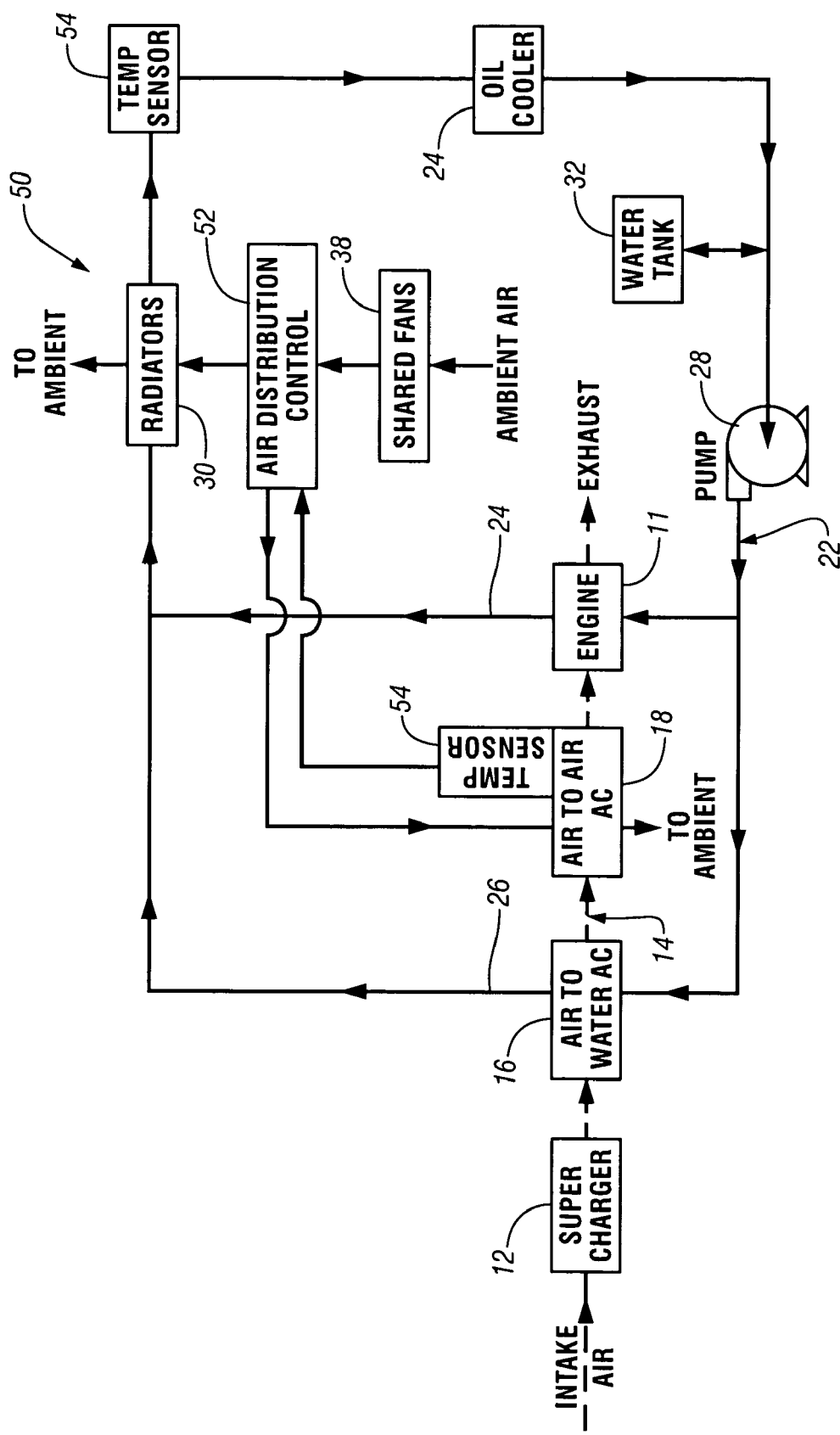
FIG. 3 is a similar view of another shared fan embodiment with parallel engine and aftercooler heat exchangers and a sensor controlled air distributor.

FIG. 3 illustrates another alternative embodiment of cooling system 50 similar to system 10. In this embodiment, the cooling air sides of the radiator 30 and air-to-air aftercooler 18 are positioned to receive circulated air flow in parallel. The shared fan 38 circulates air to an air distribution control 52, which selectively controls the amount of circulated air flow through the cooling air sides of the air-to-air aftercooler 18 and the radiator 30. Optional temperature sensors 54 may be used to detect the temperature of the intake air and the liquid coolant and relay the temperature information to the distribution control 52.

In operation, cooling system 50 is similar to system 10 in that cooling system 50 maintains the operating temperature of the engine 11 and reduces intake air temperature. As the engine 11 operates, intake air and liquid coolant temperatures are monitored by the sensors 54 and the temperature information is relayed to the air distribution control 52. The air distribution control 52 then selectively divides circulated air flow between the cooling air sides of the radiator 30 and the air-to-air aftercooler 18 to maintain desired intake air and the liquid coolant temperatures. Ambient conditions may also be considered by the air distribution control 52, to determine optimal circulated air flow ratios between the cooling air sides of the air-to-air aftercooler 18 and the radiator to maintain optimal intake air and liquid coolant temperatures.

Figure 4:
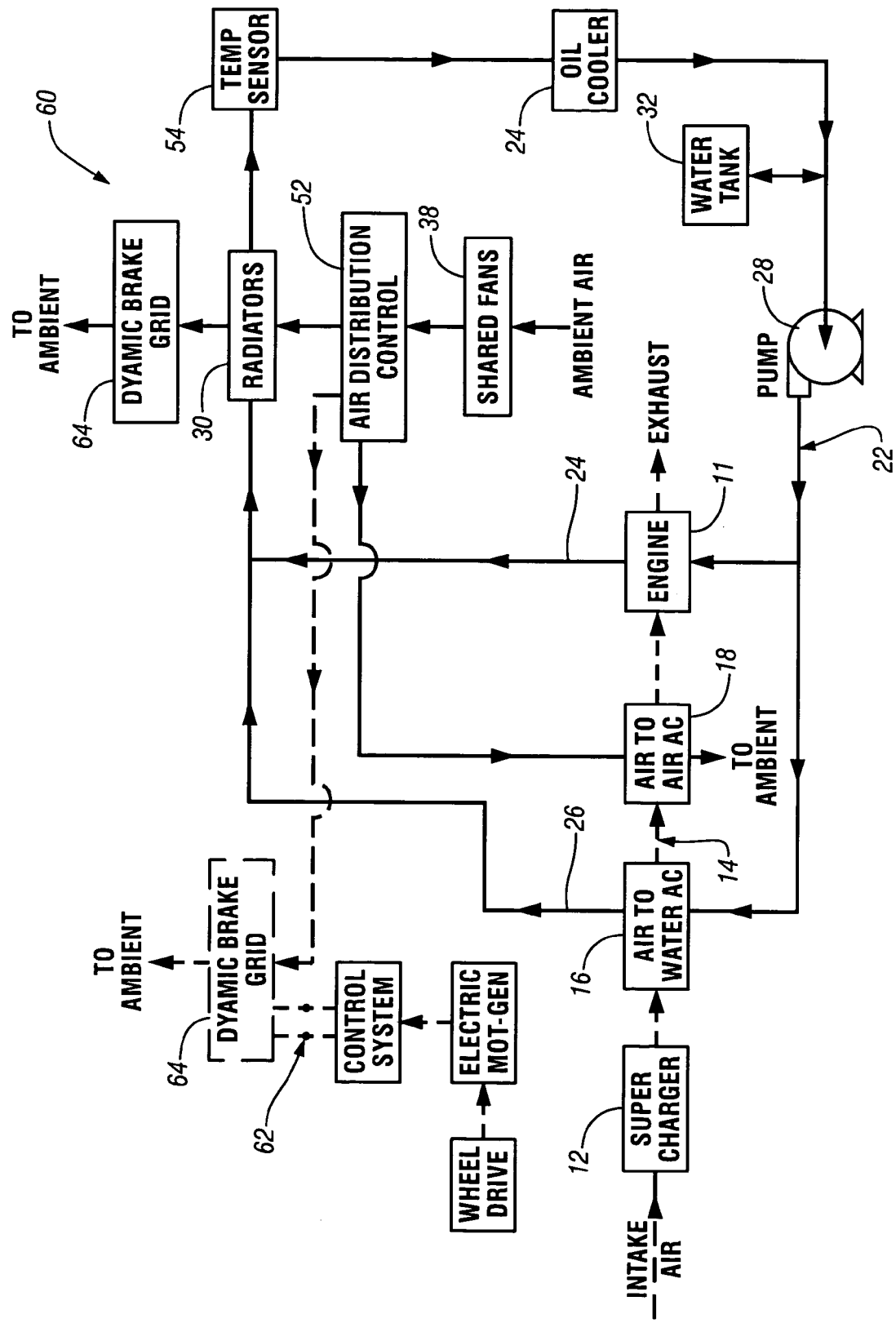
FIG. 4 is a similar view of still another embodiment including a dynamic brake grid for series or parallel air flow.

FIG. 4 shows yet another alternative embodiment of cooling system 60 similar to the cooling system 50 of FIG. 3. System 60 also includes a dynamic brake 62 operative to transform kinetic energy of the train into electric energy. The electric energy created during dynamic braking is fed into a dynamic brake grid 64, which converts the electric energy into heat that is dissipated into surrounding air. The shared fan 38 circulates air flow to a distribution control 52, which adjusts the air flow between the dynamic brake grid 64 and the cooling air sides of the air-to-air aftercooler 18 and the radiator 30. The dynamic brake grid 64 and the cooling air sides of the air-to-air aftercooler 18 and the radiator 30 may be positioned to receive air flow from the distribution control 52 in parallel or in series.

In operation, during acceleration and powered train operation, the distribution control 52 directs a majority of the circulated air flow to the cooling air sides of the radiator 30 and the air-to-air aftercooler 18 to maintain optimal liquid coolant and engine intake air temperatures. During dynamic braking, heat is generated by the dynamic brake grid 64, while engine power and boost are dramatically reduced. As a result, the cooling air sides of the air-to-air aftercooler and the radiator require less air flow to maintain optimal intake air and the liquid coolant temperatures. In order to increase the cooling capacity of the brake grid 64, the distribution control 52 diverts a majority of the circulated air flow from the cooling air sides of the air-to-air aftercooler 18 and the radiator 30 to the to brake grid 64, resulting in improved heat transfer from the brake grid to the circulated air. As needed, air may be redirected to the cooling sides of the radiator 30 and the air-to-air aftercooler 18 to maintain the desired liquid coolant and intake air temperatures during dynamic braking.

Figure 5:
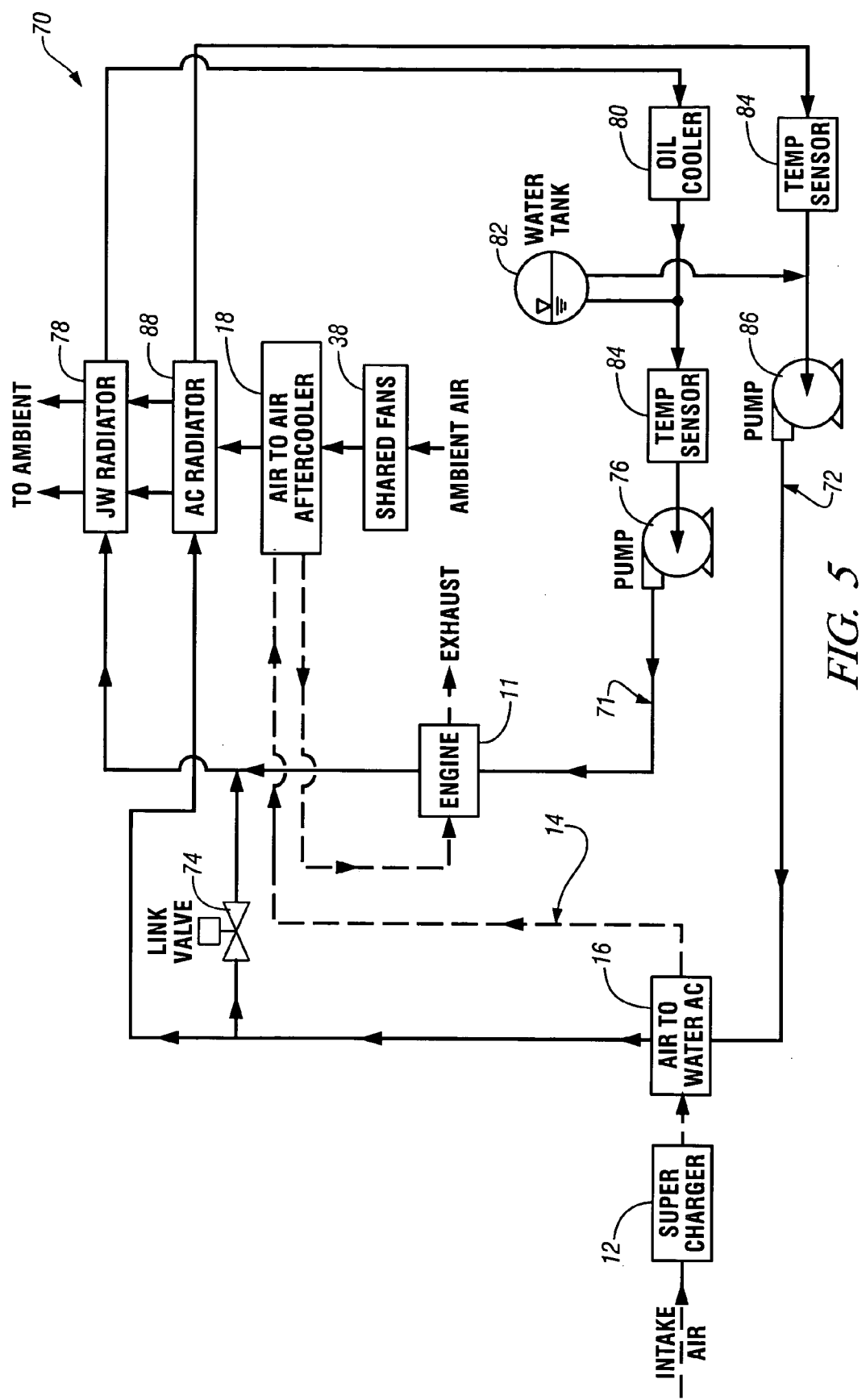
FIG. 5 is a schematic view of a further embodiment having dual cooling loops with multiple heat exchangers having series air flow.

Another alternative embodiment of a cooling system 70 is illustrated in FIG. 5. Cooling system 70 includes an intake air cooling subsystem 14 and separate first and second cooling loops 71, 72 connected by a linking valve 74 and the water tank 82. The first cooling loop 71 includes a main pump 76, the engine 11, an optional temperature sensor 84, an engine radiator 78, an oil cooler 80, and a water tank 82. The second liquid cooling loop 72 includes an aftercooler pump 86, an optional temperature sensor 84, the water side of the air-to-water aftercooler 16, an aftercooler radiator 88, and the water tank 82. Cooling air sides of an air-to-air aftercooler 18, the engine radiator 78 and the aftercooler radiator 88 are positioned to receive air flow in series from shared fans 38.

In operation, the pumps 76, 86 circulate liquid coolant through the cooling loops 71, 72. As the liquid coolant circulates through the loops, the temperature sensors 84 monitor the temperature of the liquid coolant. Based upon the temperatures of the liquid coolant in each of the cooling loops 71, 72, the linking valve 74 diverts liquid coolant between the loops, as needed, to maintain optimal intake air and liquid coolant operating temperatures.

During engine operation in low ambient temperatures, a portion of the liquid coolant, heated by the engine, in the first liquid cooling loop 71 may be diverted into the second liquid cooling loop 72 to increase the temperature of the liquid coolant in the second liquid cooling loop and thereby prevent overcooling of the intake air.

During engine operation in high ambient temperatures, a portion of the liquid, heated by the air-to-water aftercooler 16, in the second liquid cooling loop 72 may be diverted to the first liquid cooling loop 71 to reduce the temperature of the liquid coolant in the first liquid cooling loop and thereby reduce engine operating temperatures.

Heat is removed from the cooling system 70 by circulated air generated by the shared fans 38. Preferably, the shared fans 38 circulate air through the cooling air side of the air-to-air aftercooler 18 first to provide maximum cooling to the intake air. The circulated air is then passed through the cooling air sides of the aftercooler radiator 88 in the second cooling loop and the engine radiator 78 in the first cooling loop 71 to provide preferred cooling to the aftercooler.

Figure 6:
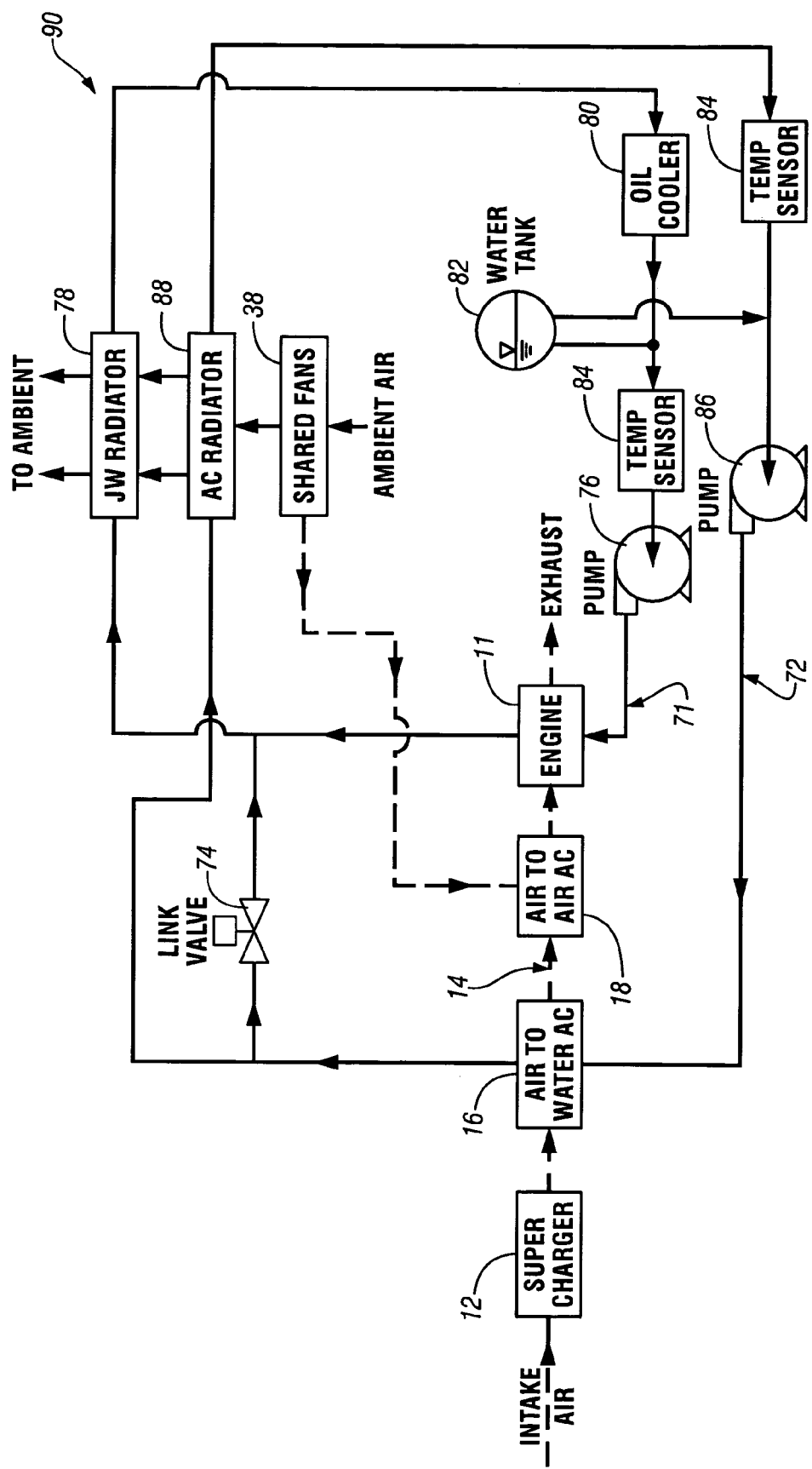
FIG. 6 is a similar view of a modified embodiment with parallel and series cooling air flow.

FIG. 6 shows another embodiment of cooling system 90, similar to the cooling system 70 of FIG. 5. In system 90, shared fans 38 circulate air flow to the cooling air sides of an air-to-air aftercooler 18, an engine radiator 78 and an aftercooler radiator 88. Preferably, the cooling air side of the air-to-air aftercooler 18 is positioned to receive circulated air flow in parallel with the cooling air sides of the aftercooler radiator 88 and the engine radiator 78, which receive circulated air flow in series.

In operation, the cooling system 90 operates similarly to cooling system 70 of FIG. 5, in that the cooling system 90 maintains liquid coolant temperatures within cooling loops 71, 72 and maintains intake air temperatures to provide intake air the engine 11 at optimal temperatures.

Figure 7:
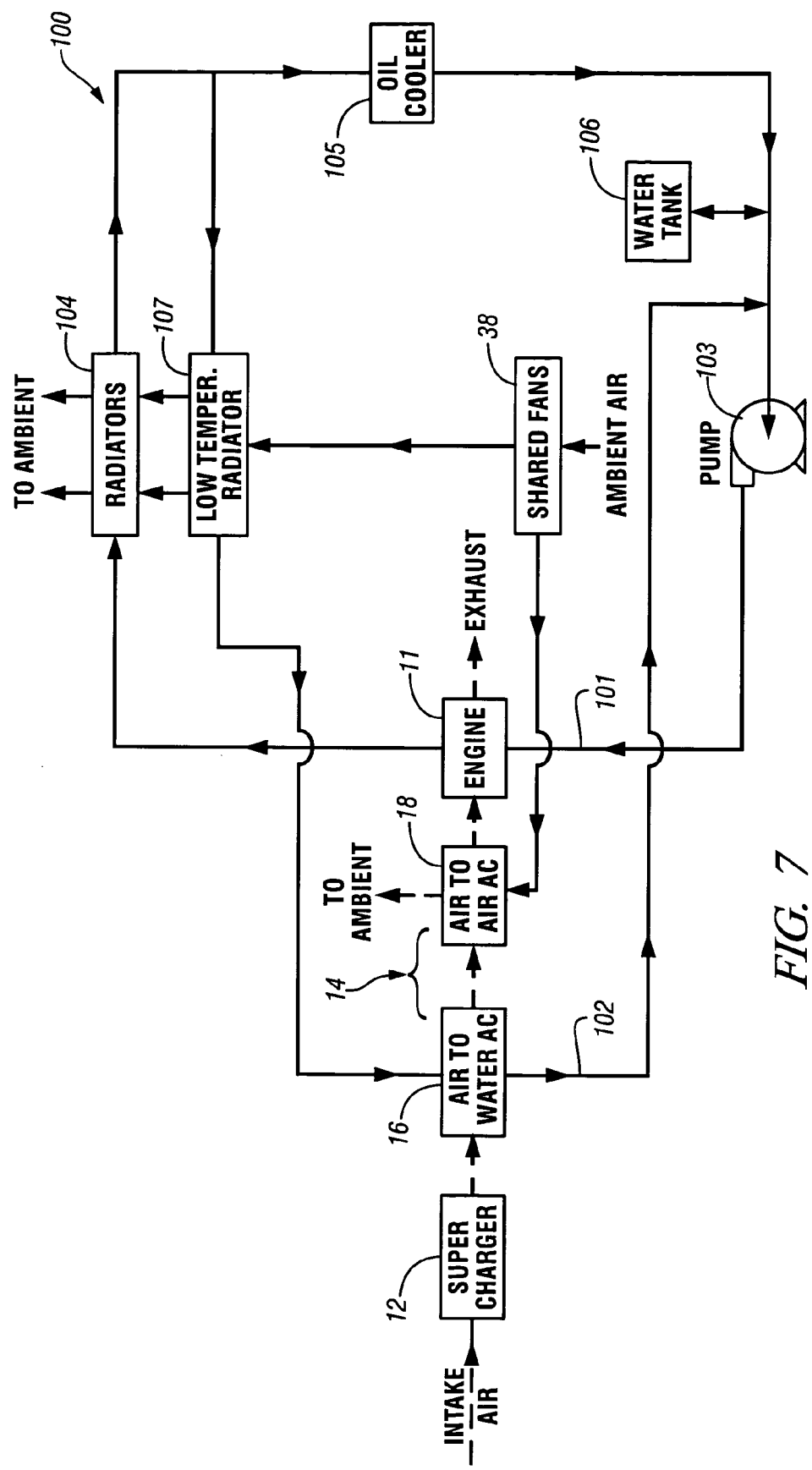
FIG. 7 is a similar view of still another embodiment of a cooling system with series and parallel water and air flow.

In still another alternative embodiment, illustrated in FIG. 7, a cooling system 100 includes an intake air cooling subsystem 14 and first and second partially overlapping parallel cooling loops 101, 102. The first cooling loop 101 includes a pump 103, an engine 11, a main radiator 104, an oil cooler 105 and a water tank 106. The second cooling loop 102 includes the pump 103 and the main radiator 104, together with a supplemental low temperature radiator 107, and the water side of an air-to-water aftercooler 16.

The cooling system 100 further includes shared fans 38, which circulate air through the cooling air side of the air-to-air aftercooler, in parallel with the low temperature radiator 107 and the main radiator 104 in series.

The pump 103 discharges liquid coolant through both cooling loops 101, 102. The liquid coolant is initially circulated from the pump 103 through the water side of the engine 11 where excess heat from the engine is transferred to the liquid coolant. The liquid coolant, heated by the engine 11, is then directed to the main radiator 104 for cooling. Liquid coolant passing through the first loop 101 from the main radiator 104 then enters the oil cooler 105 and finally returns to the pump 103. Liquid coolant directed through the second loop 102, from the main radiator 104, is subcooled in the low temperature radiator 107 and then circulated through the water side of the air-to-water aftercooler 16 where excess heat in the intake air is transferred to the liquid coolant. The liquid coolant in the second loop 102 is returned to the pump 103 to be recirculated through the cooling system.

The shared fans 38 circulate air flow between the cooling air sides of the air-to-air aftercooler 18, the low temperature radiator 107, and the main radiator 104 to exchange heat from the intake air and the liquid coolant to the circulated air.

Figure 8:
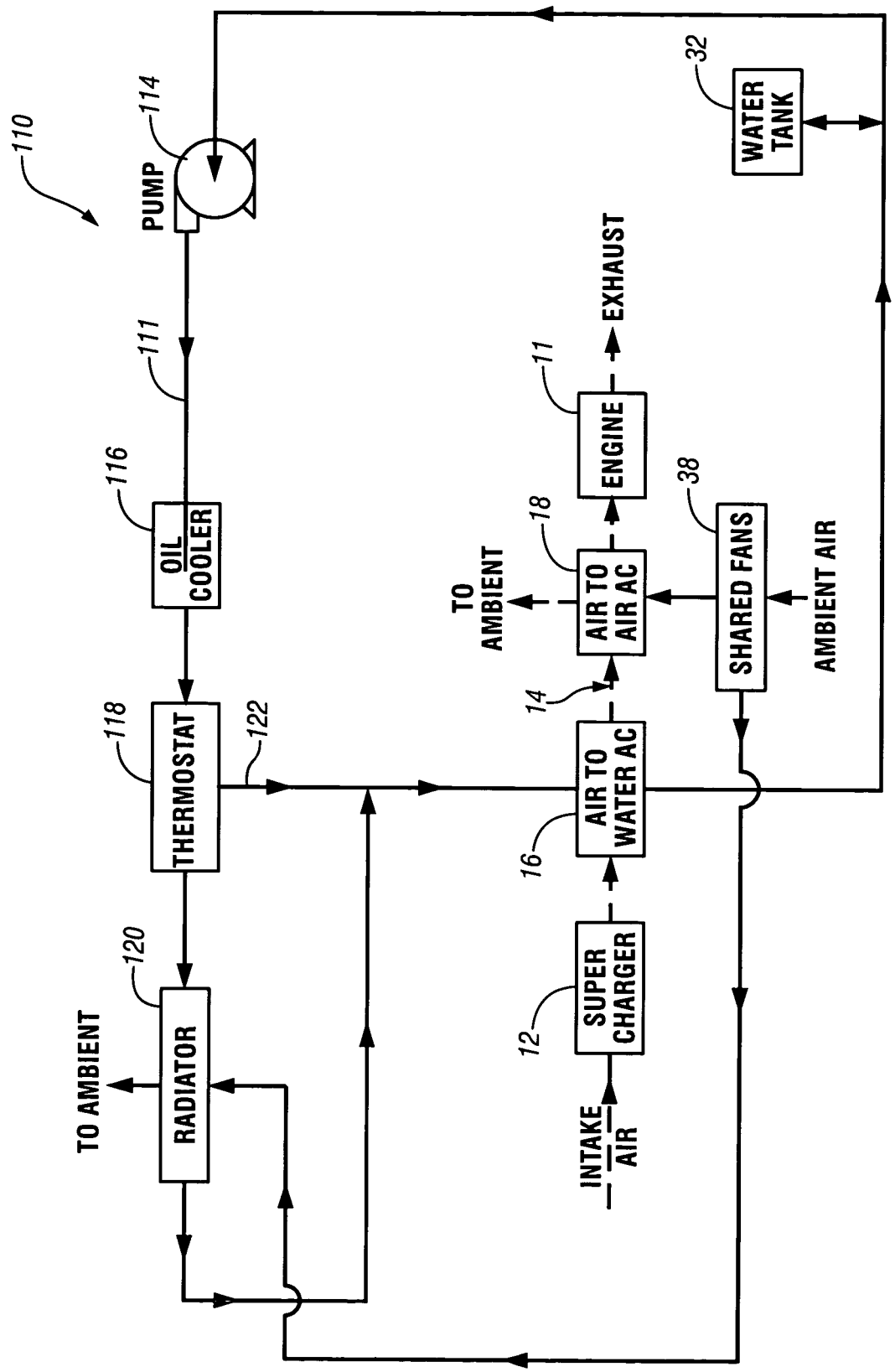
FIG. 8 is a similar view of yet another embodiment with a thermostat controlling radiator liquid coolant flow and with parallel air flow.

In yet another alternative embodiment, illustrated in FIG. 8, an intake air aftercooling system 110 includes an intake air cooling subsystem 14 and a liquid cooling subsystem 111. The liquid cooling subsystem 111 includes a pump 114, an optional oil cooler 116, a thermostat 118, a radiator 120 and the water side of an air-to-water aftercooler 16. The thermostat connects with a radiator bypass 122 to control the coolant at a desired minimum operating temperature. Shared fans 38 circulate ambient air in parallel through the cooling air sides of the radiator 120 and an air-to-air aftercooler 18 to control the temperature of the liquid coolant and the intake air.

In the liquid cooling subsystem 111, coolant is discharged from the pump 114 to the oil cooler where excess heat is transferred from engine oil to the liquid coolant. When the temperature of the liquid coolant is below an optimal temperature, the thermostat directs liquid coolant partially or fully from the oil cooler, through the bypass 122 to the air-to-water aftercooler where heat is transferred from the intake air to the liquid coolant. The liquid coolant is then finally returned to the pump to be recirculated. When the temperature of the liquid coolant reaches a desired minimum, the thermostat directs liquid coolant, to the radiator 120 which discharges heat in the liquid coolant to the circulated air provided by the shared fans 38. The liquid coolant is then directed to the air-to-water aftercooler and finally back to the pump to be recirculated.

The shared fans 38 circulate air flow through the radiator 120 and the air-to-air aftercooler 18 to exchange heat from the intake air and the liquid coolant to the circulated air.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A cooling system for an internal combustion engine having a supercharger for increasing the density of intake air supplied to the engine, the cooling system comprising:

a liquid cooling subsystem including at least one liquid cooling loop having a pump communicating with a radiator and the engine for unidirectional circulation of liquid coolant;

an intake air cooling subsystem including an air-to-water aftercooler having an intake air side receiving intake air from the supercharger and a water side receiving liquid coolant from the liquid cooling subsystem, and an air-to-air aftercooler having an intake air side receiving intake air from the air-to-water aftercooler;

a shared fan circulating air flow through cooling air sides of the air-to-air aftercooler and the radiator;

an air distribution control operative to control the amount of circulated air flow directed from the shared fan to the cooling air sides of the radiator and the air-to-air aftercooler;

the air-to-water aftercooler being operative to exchange heat between the intake air and liquid coolant; and the air-to-air aftercooler being operative to exchange heat between the intake air and circulated air.

2. An intake air cooling system as in claim 1 wherein the cooling air sides of the radiator and the air-to-air aftercooler are positioned in series to receive circulated air flow from the shared fan.

3. An intake air cooling system as in claim 1 wherein the cooling air sides of the radiator and the air-to-air aftercooler are positioned in parallel to receive circulated air flow from the shared fan.

4. An intake air cooling system as in claim 1 including an oil cooler connected to the cooling loop to receive unidirectional liquid coolant flow and operative to transfer lubrication oil heat to liquid coolant.

5. An intake air cooling system as in claim 1 including a liquid coolant reservoir operative to contain reserve liquid coolant and connected to the cooling loop to provide reserve coolant to the liquid cooling loop.

6. An intake air cooling system as in claim 1 including a dynamic braking grid positioned in parallel with the cooling air sides of the air-to-air aftercooler and the radiator to receive circulated air flow from the shared fan.

7. An intake air cooling system as in claim 6 wherein the air distribution control is operative to control the amount of circulated air flow directed from the shared fan to cooling air sides of the radiator, the dynamic brake grid and the air-to-air aftercooler.

8. An intake air cooling system for internal combustion engine having a supercharger for increasing the density of intake air supplied to the engine, the cooling system comprising:

a liquid cooling subsystem including at least one liquid cooling loop having an aftercooler pump communicating with a radiator for unidirectional circulation of liquid coolant;

an intake air subsystem including an air-to-water aftercooler having an intake air side receiving intake air from the supercharger and a water side receiving liquid coolant from the liquid cooling subsystem, and an air-to-air aftercooler having an intake air side receiving intake air from the air-to-water aftercooler; and a shared fan circulating air flow through cooling air sides of the air-to-air aftercooler and the radiator;

an air distribution control operative to control the amount of circulated air flow directed from the shared fan to the cooling air sides of the air-to-air aftercooler and the radiator;

the air-to-water aftercooler being operative to exchange heat between the intake air and liquid coolant;

the air-to-air aftercooler being operative to exchange heat between the intake air and circulated air.

9. An intake air cooling system as in claim 8 including a radiator bypass passage regulated by a thermostat operative to selectively bypass liquid coolant flow to the radiator to maintain an optimal liquid coolant temperature.

10. An intake air cooling system as in claim 8 wherein the cooling air sides of the air-to-air aftercooler and the radiator are positioned in series to receive circulated air flow from the shared fan.

11. An intake air cooling system as in claim 8 wherein the cooling air sides of the air-to-air aftercooler and the radiator are positioned in parallel to receive circulated air flow from the shared fan.

12. A cooling system for an internal combustion engine having a supercharger for increasing the density of intake air supplied to the engine, the cooling system comprising:

a liquid cooling subsystem including at least one liquid cooling loop having a pump communicating with a radiator and the engine for unidirectional circulation of liquid coolant;

an intake air cooling subsystem including an air-to-water aftercooler having an intake air side receiving intake air from the supercharger and a water side receiving liquid coolant from the liquid cooling subsystem, and an air-to-air aftercooler having an intake air side receiving intake air from the air-to-water aftercooler;

a shared fan circulating air flow through cooling air sides of the air-to-air aftercooler and the radiator;

a dynamic brake grid positioned in parallel with the cooling air sides of the air-to air aftercooler and the radiator to receive circulated air flow from the shared fan;

the air-to-water aftercooler being operative to exchange heat between the intake air and liquid coolant; and the air-to-air aftercooler being operative to exchange heat between the intake air and circulated air.

13. An intake air cooling system as in claim 12 including an air distribution control operative to control the amount of circulated air flow direct from the shared fan to cooling air sides of the radiator, the dynamic brake grid and the air-to-air aftercooler.

14. A cooling system for an internal combustion engine having a supercharger for increasing the density of intake air supplied to the engine, the cooling system comprising:

a liquid cooling subsystem including a first liquid cooling loop comprising a main pump communicating with a main radiator and the engine for unidirectional circulation of liquid coolant, and a second liquid cooling loop comprising an afterccoler pump communicating with an aftercooler radiator for unidirectional circulation of liquid coolant;

a valve apparatus linking the first and second cooling loops and operative to control liquid coolant flow between the cooling loops;

an intake air cooling subsystem including an air-to-water aftercooler having an intake air side receiving intake air from the supercharger and a water side receiving liquid coolant from the second cooling loop, and an air-to-air aftercooler having an intake air side receiving intake air from the air-to-water aftercooler;

a shared fan circulating air flow through cooling air sides of the air-to-air radiator, the aftercooler radiator, and the main radiator;

an air distribution control operative to control the amount of circulated air flow directed from the shared fan to the cooling air sides of the air-to-air radiator, the aftercooler radiator, and the main radiator;

the air-to-water aftercooler being operative to exchange heat between the intake air and liquid coolant; and the air-to-air aftercooler being operative to exchange heat between the intake air and circulated air.

15. A cooling system for an internal combustion engine having a supercharger for increasing the density of intake air supplied to the engine, the cooling system comprising:

a liquid cooling subsystem including a first liquid cooling loop having a pump communicating with the engine and a main radiator and the engine for unidirectional circulation of liquid coolant, and a second liquid cooling loop including the pump, the engine, the main radiator, a supplemental low temperature radiator and a water cooling side of an air-to water aftercooler for unidirectional circulation of liquid coolant;

an intake air cooling subsystem including an air-to-water aftercooler having an intake air side receiving intake air from the supercharger, and an air-to-air aftercooler having an intake air side receiving intake air from the air-to-water aftercooler;

a shared fan circulating air flow through cooling air sides of the air-to-air radiator, the aftercooler radiator, and the main radiator;

an air distribution control operative to control the amount of circulated air flow directed from the shared fan to the cooling air sides of the air-to-air radiator, the aftercooler radiator, and the main radiator;

the air-to-water aftercooler being operative to exchange heat between the intake air and liquid coolant; and the air-to-air aftercooler being operative to exchange heat between the intake air and circulated air.

* * * * *